(12) United States Patent
Liang

(10) Patent No.: US 12,481,143 B2
(45) Date of Patent: Nov. 25, 2025

(54) ALL-REFLECTIVE MICROSCOPY

(71) Applicant: Arizona Board of Regents on Behalf of the University of Arizona, Tucson, AZ (US)

(72) Inventor: Rongguang Liang, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 418 days.

(21) Appl. No.: 18/043,476

(22) PCT Filed: Aug. 30, 2021

(86) PCT No.: PCT/US2021/048244
§ 371 (c)(1),
(2) Date: Feb. 28, 2023

(87) PCT Pub. No.: WO2022/047313
PCT Pub. Date: Mar. 3, 2022

(65) Prior Publication Data
US 2023/0324663 A1  Oct. 12, 2023

Related U.S. Application Data

(60) Provisional application No. 63/072,491, filed on Aug. 31, 2020.

(51) Int. Cl.
*G02B 21/04* (2006.01)
*G02B 13/14* (2006.01)
*G02B 17/08* (2006.01)

(52) U.S. Cl.
CPC ........... *G02B 21/04* (2013.01); *G02B 13/146* (2013.01); *G02B 17/0832* (2013.01)

(58) Field of Classification Search
CPC .. G02B 21/04; G02B 13/146; G02B 17/0832; G02B 21/00; G02B 21/0004;
(Continued)

(56) References Cited

U.S. PATENT DOCUMENTS

| 10,054,782 B2 | 8/2018 | Rowlette et al. |
| 2002/0071377 A1 | 6/2002 | Ogata |

(Continued)

FOREIGN PATENT DOCUMENTS

| CN | 106980174 B | 4/2019 | |
| DE | 102007062198 A1 * | 6/2009 | ......... G02B 17/0844 |

OTHER PUBLICATIONS

Amirsolaimani, Babak, et al., "All-reflective multiphoton microscope," Optics Express vol. 25, No. 19, pp. 23399-23407, 2017.
(Continued)

*Primary Examiner* — Arnel C Lavarias
(74) *Attorney, Agent, or Firm* — Perkins Coie LLP

(57) ABSTRACT

Devices, systems and methods related to all-reflective microscopes are described. The microscopes include an all-reflective off-axis optical system and is characterized with substantially zero chromatic aberration, low group delay dispersion and no central obscuration. One reflective microscope configuration includes a reflective objective subsection with at least three mirrors, where at least one mirror is off-axis and non-spherical. The reflective microscope also includes a reflective relay subsection with at least two minors having freeform surfaces and positioned to receive light from the reflective objective subsection. The reflective relay subsystem is configured to produce a magnification to allow coupling of light between two planes having differing beam sizes. The reflective microscope further includes an imaging subsection with at least one mirror having a freeform surface and positioned to receive light
(Continued)

from the reflective relay subsection and to direct light received thereon in reflection in a direction of a sensor.

12 Claims, 11 Drawing Sheets

(58) Field of Classification Search
CPC .... G02B 21/0032; G02B 21/02; G02B 13/14; G02B 13/143; G02B 17/00; G02B 17/02; G02B 17/06; G02B 17/0647; G02B 17/0663; G02B 17/0642
USPC ....... 359/368, 362, 363, 364, 365, 366, 369, 359/433, 434, 838, 850, 857, 858, 861, 359/864
See application file for complete search history.

(56) References Cited

U.S. PATENT DOCUMENTS

| | | |
|---|---|---|
| 2011/0165522 A1 | 7/2011 | Mann et al. |
| 2013/0188034 A1* | 7/2013 | Juette .................. G02B 21/361 250/353 |
| 2013/0229722 A1* | 9/2013 | Vogel ..................... G02B 21/04 359/858 |
| 2018/0284411 A1 | 10/2018 | Dohi et al. |
| 2019/0196172 A1 | 6/2019 | Hillman |
| 2021/0255446 A1 | 8/2021 | Hanninen et al. |

OTHER PUBLICATIONS

International Search Report and Written Opinion mailed Jan. 31, 2022 for International Patent Application No. PCT/US2021/048244.

Li, Zexiao, et al., "Integrated manufacture of a freeform off-axis multi-reflective imaging system without optical alignment," Optics Express vol. 26, No. 6, pp. 7625-7637, 2018.

Yang, Tong, et al., "Design method of freeform off-axis reflective imaging systems with a direct construction process," Optics Express vol. 22, No. 8, p. 9193-9205, (2014).

Ge, P., et al., "An off-axis, reflective system for uniform near-field illumination in optical microscopy," Lighting Res. Technol. 2018; 50: 787-795.

Xiao, Xisheng, et al., "Locating optimal freeform surfaces for off-axis optical systems," Optics Communications 467 (2020).

* cited by examiner

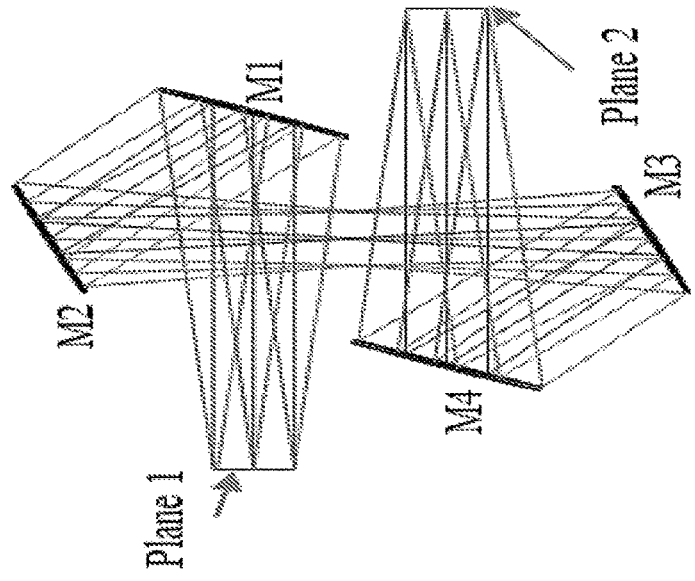
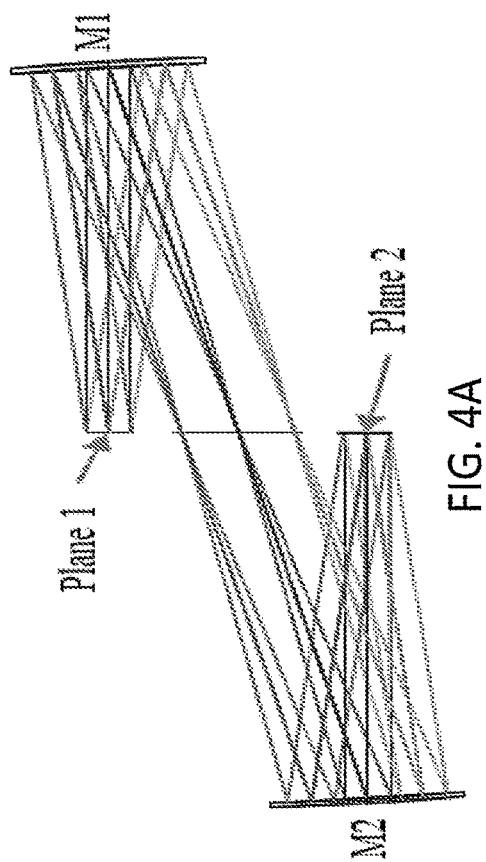
FIG. 4A
FIG. 4B
FIG. 4C

ALL-REFLECTIVE MICROSCOPY

CROSS-REFERENCE TO RELATED APPLICATION(S)

This patent document is a 371 National Phase Application of International Patent Application No. PCT/US2021/048244, filed Aug. 30, 2021, which claims priority to the provisional application with Ser. No. 63/072,491 titled "ALL-REFLECTIVE MICROSCOPY," filed Aug. 31, 2020. The entire contents of the above noted applications are incorporated by reference as part of the disclosure of this document.

STATEMENT REGARDING FEDERALLY SPONSORED RESEARCH

This invention was made with government support under Grant No. 2034210, awarded by NSF. The government has certain rights in the invention.

TECHNICAL FIELD

The disclosed technology relates to microscopy systems and method for manufacturing the same, and particularity relate to microscopes with reflective components.

BACKGROUND

Optical microscopy is key in modern biological research with several features that make it ideally suited to study biology in living cells: (1) the resolution matches well to the size of subcellular structures; (2) a diverse range of available fluorescent probes makes it possible to mark proteins, organelles, and other structures for imaging; (3) the relatively nonperturbing nature of light can image living cells for long periods of time to follow their dynamics; and (4) a wide spectral range enables various imaging modalities to investigate cell structural, molecular, and chemical characteristics and cellular processes.

In the past few decades various advanced microscope imaging techniques have been developed, including phase contrast, differential interference contrast, multispectral, polarization, confocal, fluorescence, multiphoton, nonlinear, light sheet, Raman, ultra violet (UV), infrared (IR), thermal, and super-resolution techniques. Most of these imaging techniques are in visible and near-IR (NIR) regions, with the UV and IR varieties having been much less probed for biological research, partly due to the lack of a UV and IR microscope, light source, and detector. Therefore, there is a need for improved microscopes that are operable in a wide range of wavelengths and provide additional features and benefits that are further described in this patent document.

SUMMARY

The disclosed embodiments relate to all reflective microscopes that, among other features and benefits, include an all-reflective off-axis optical system to provide light from a light source to a sample and back to a detector with substantially zero chromatic aberration, low group delay dispersion and no central obscuration. Devices, systems and methods for construction the microscopes and associated components are disclosed.

One aspect of the disclosed embodiments relates to a reflective microscope that includes a reflective objective subsection having at least three mirrors, wherein at least one mirror is off-axis and non-spherical. The reflective microscope also includes a reflective relay subsection including at least two mirrors having freeform surfaces and positioned to receive light from the reflective objective subsection. The reflective relay subsystem is configured to produce a magnification to allow coupling of light between two planes having differing beam sizes. The reflective microscope further includes an imaging subsection including at least one mirror having a freeform surface and positioned to receive light from the reflective relay subsection and to direct light received thereon in reflection in a direction of a sensor.

BRIEF DESCRIPTION OF THE DRAWINGS

FIG. 4A illustrates a first example of an all-reflective relay lens that can be used in the disclosed microscope configurations.

FIG. 4B illustrates a second example of an all-reflective relay lens that can be used in the disclosed microscope configurations.

FIG. 4C illustrates a third example of an all-reflective relay lens that can be used in the disclosed microscope configurations.

DETAILED DESCRIPTION

Figure 1:
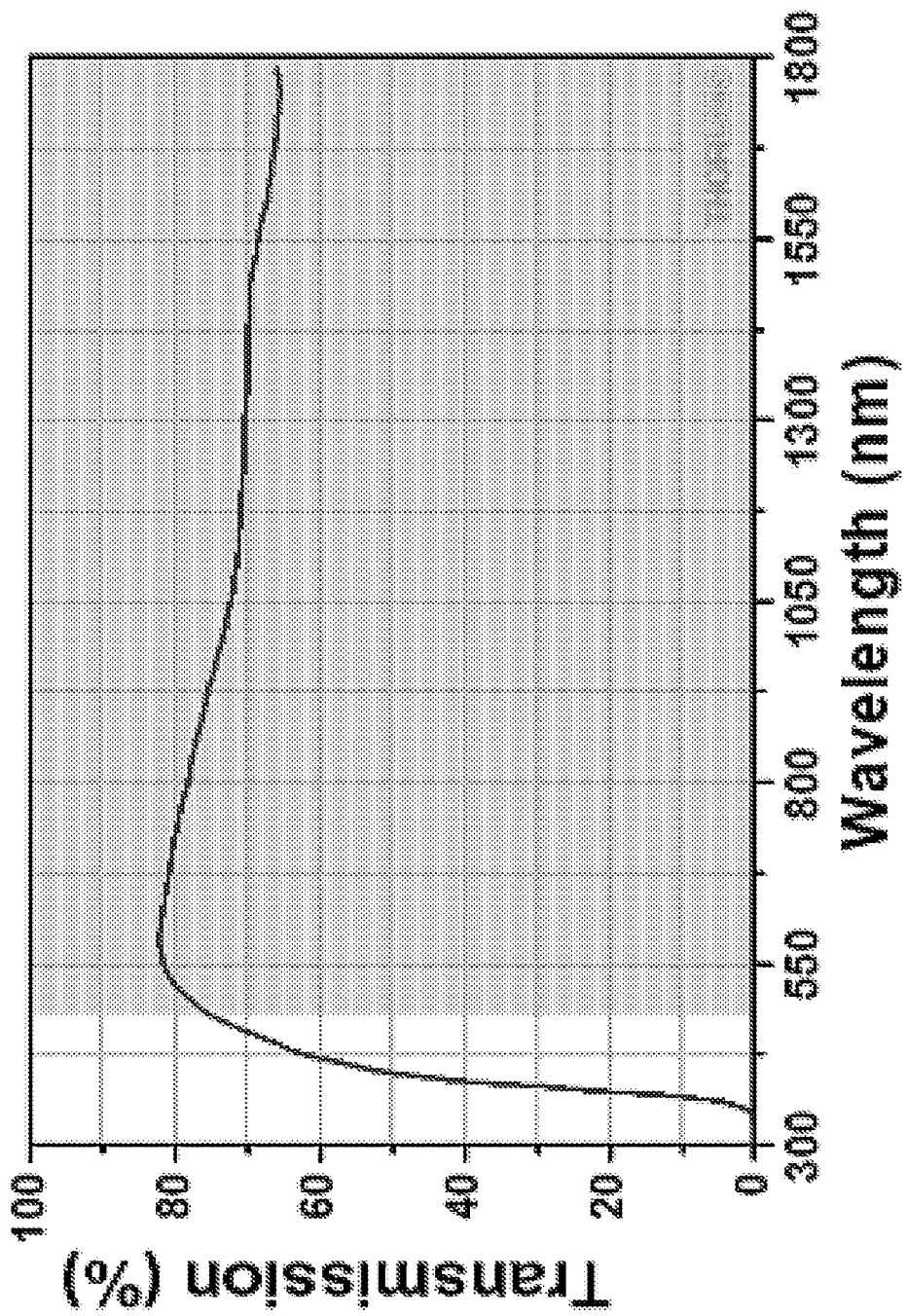
FIG. 1 illustrates transmission characteristics of an example objective lens in the visible to near infrared (NIR) regions.

New imaging technologies also stimulate the development of new microscope instruments, and each microscope imaging technique has special requirements. One example is a microscope for nonlinear imaging that should have low group delay dispersion (GDD) to obtain stronger nonlinear optical signals. A second example is a microscope for three-photon imaging that should have high transmission and small chromatic aberrations from the deep blue to NIR regions. Unfortunately, no single microscope or objective can broadly meet the needs of biological research as current microscope objectives are designed for specific imaging techniques to maximize the microscopes' performance.

Compared to visible and NIR, a UV microscope offers: (1) improved image resolution due to the shorter wavelength; and (2) when combined with spectroscopy, quantitative information with access to many endogenous molecules that play important roles in cell function and structure. Moreover, the information given by visible and NIR optical microscopes is limited and superficial as it does not shed any light on the underlying molecular changes. IR microscopy, on the other hand, can provide such details by measuring the molecular composition of tissues and detect individual cells and molecules without the need for fluorescent labels. Particularly, absorptions in the mid-IR (MIR) are very strong and can identify chemicals by their absorption features ("molecular fingerprint"). A MIR laser illuminates the sample and excites the molecules to change both the temperature and refractive index within a cell or tissue, which is measured by visible and NIR light. Unfortunately, no single microscope can image from the visible to MIR.

Due to glass dispersion and absorption, a refractive microscope can only work in a relatively narrow spectral range. Accordingly, biological phenomena at different spectra cannot be observed and compared simultaneously, and data cannot be collected over the wide spectrum as the same time. Even in each spectral band, the refractive microscope still has the following three major limitations:

(1) Chromatic aberration. Due to the glass dispersion (refractive index as a function of wavelength) and the limited available optical glasses, it is very difficult to correct the chromatic aberrations over the wide spectrum. This means that the illumination focal points or imaging points are different for different wavelengths. Typically, the microscope is designed and commercialized separately in the UV, Visible/NIR, and IR. Thus, more than one microscope is needed to obtain data from UV to IR, and the data from the different microscopes are not registered. It is not possible to observe the tissue and cellular dynamics in real time from UV to IR.

(2) Group delay dispersion (GDD). GDD limits the use of ultrashort pulses in nonlinear imaging. Group delay is the relative amount of time that light of different wavelengths is delayed as it travels through the optical system. GDD describes how rapidly the group delay varies with wavelength of light. When a pulse is transmitted from an ultrafast laser source through optics or is reflected off a thin-film coated mirror, the pulse width may increase and the peak power may decrease. Pulse broadening is undesirable for applications that rely on high peak power, such as multiphoton and other nonlinear optical processes. A reduction in peak power of a factor of 2 results in a reduction in signal of much more than a factor of 2, typically 4 or more. As the most important component in the microscope, the refractive objective typically introduces significant GDD (e.g., 2000-6500 $fs^2$). Chirp compensation optics (such as specially designed mirrors) are frequently used to provide "negative chirp" and pre-condition the pulse before it arrives at the objective or other positive GDD optics.

(3) Low throughput. Due to the large number of lens elements, the transmission of the objective is relatively low, particularly in the UV region. The light loss is mainly from surface reflection (even with antireflection (AR) coating) and material absorption. Except for a few abnormal glasses, such as $CaF_2$, optical glass typically has high absorption in the UV spectrum. To reduce the surface reflection, AR coating is essential for each refractive optical surface; however, AR coating is very sensitive to the wavelength and angle of incidence. AR coatings cannot feasibly achieve high transmission over a wide spectral band. Commercial optical components, including microscope objectives, are only suitable for a relatively narrow spectral range, such as UV, visible, visible-NIR, or NIR. Even with an excellent broadband AR coating, the transmission remains relatively low. Assuming the average transmission of each surface is 0.99 with an excellent broadband AR coating, the transmission loss due to surface reflection is $(1-0.99^n)$, with n representing the number of surfaces. For a 10-element objective, and n=20, the transmission loss is (1-0.8179) or 18.2%. FIG. 1 is the transmission curve of a 20× Mitutoyo Plan Apochromat Objective, visible NIR (480-1800 nm), 0.40 numerical aperture (NA), 20.0 mm WD. The transmission peak is only 80% and decreases sharply below 500 nm. Transmission is less than 70% beyond 1100 nm.

One way to avoid chromatic aberrations and improve light efficiency in UV and IR regions is through reflective optics. The reflective microscope objectives disclosed herein have at least the following advantages:

(1) No chromatic aberrations: A reflective microscope allows (1) ultra-wide spectral imaging, from UV to far-IR, and (2) co-localization between excitation and detection wavelengths.

(2) Low GDD: Metallic surfaces or metal coatings usually have very low GDD over a very broad range of wavelengths, enabling stronger nonlinear optical signals without additional compensation. While a bare silver coating has almost no dispersion, some silver mirrors have a dielectric protection coating which can increase the dispersion, especially when the dielectric coating is used to enhance spectral features, but the GDD can be controlled to less than 30 $fs^2$. Additional metallic coatings, such as aluminum and gold can also be utilized.

(3) Wide working spectrum: Metallic surfaces and metal coatings usually have high reflectivity from UV to far-IR and the reflectivity in the spectral range of interest can be further enhanced with coatings.

Other advantages include higher laser-induced damage threshold and better thermal properties.

In biomedical imaging, reflective optics have been investigated and used for wide spectral imaging and nonlinear imaging. For example, reflective objectives have been incorporated in multiphoton imaging to combine beams at 3.39 µm and 775 nm. A reflective relay lens has also been investigated to perform simultaneous multiphoton imaging with multiple illumination wavelengths.

While the classical Schwarzschild-type reflective objectives are commercially available and there are some efforts in developing reflective optics for biological imaging, commercial objectives and current approaches still have some major limitations that are explained below with the help of FIGS. 2A to 2C.

Figure 2A:
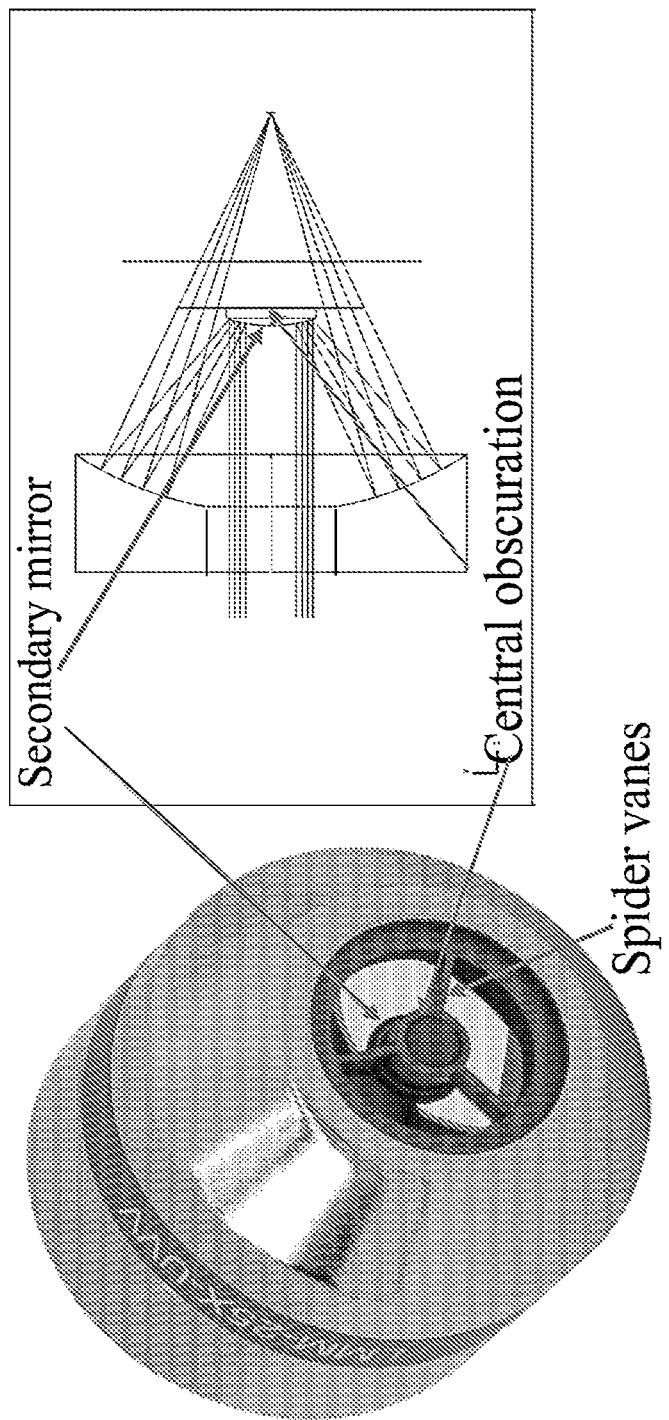
FIG. 2A illustrates an example Schwarzschild objective and the associated optical layout.
Figure 2B:
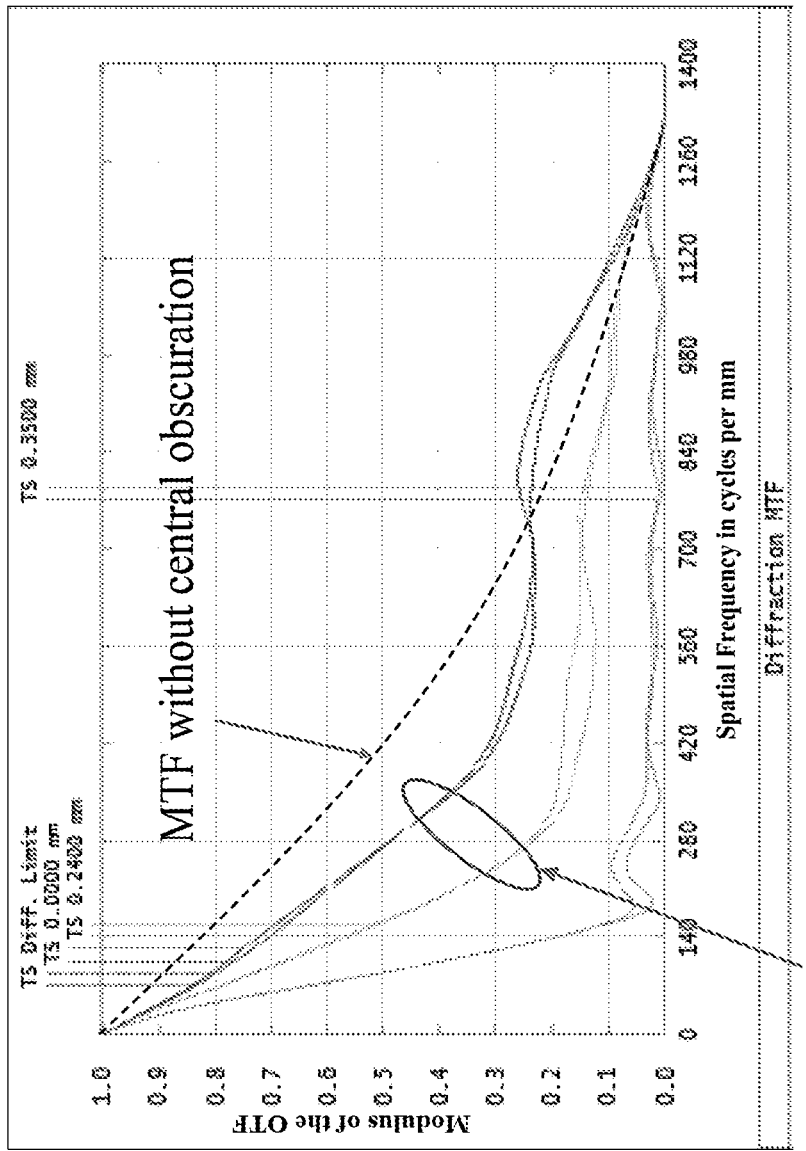
FIG. 2B illustrates a set of modulation transfer function (MTF) plots associated with the objective of FIG. 2A.
Figure 2C:
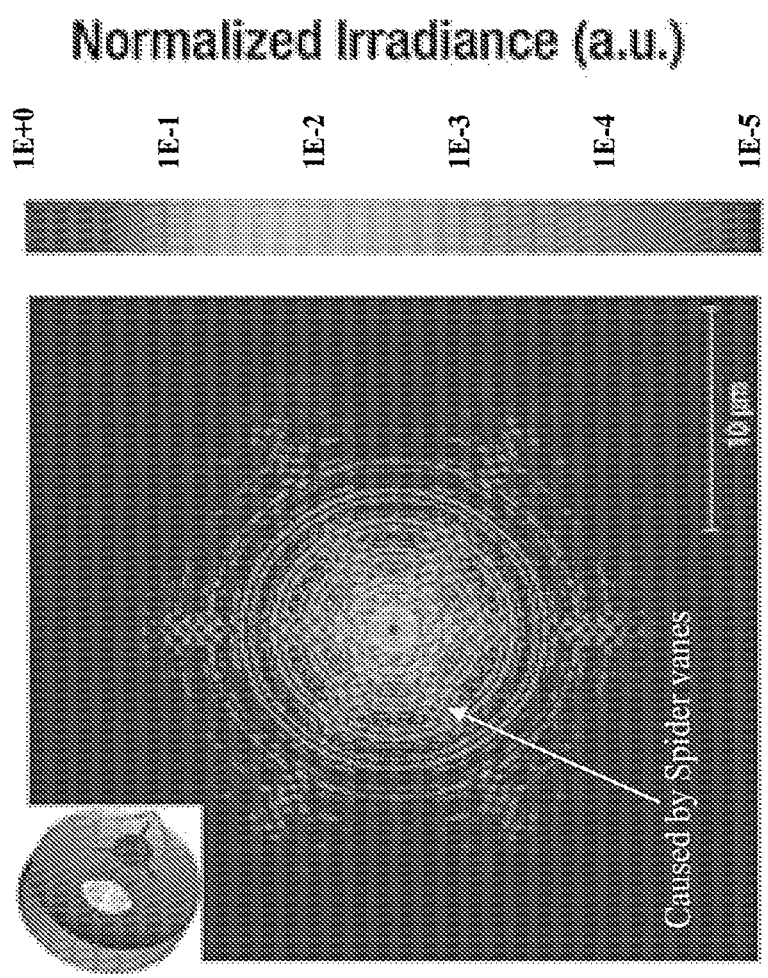
FIG. 2C illustrates an example diffraction pattern at the focal point of the objective of FIG. 2A.

The left-hand side of FIG. 2A shows an image of a 25×, 0.40 NA Schwarzschild objective (Thorlabs LMM-25X-UVV), and the associated optical layout is provided on the right-hand side. FIG. 2B illustrates the modulation transfer functions (MTFs) for 0, 0.7, and 1.0 fields of view associated with the objective lens of FIG. 2A. FIG. 2C illustrates the associated diffraction pattern at the focal point. The optical layout of the lens consists of two concentric mirrors. The convex secondary mirror and the spider vanes used to support the secondary mirror act as a central obscuration, decreasing the transmitted light (FIG. 2B) and modifies the diffraction pattern (FIG. 2C). Due to the central obscuration, there are a number of limitations.

(a) Low image contrast. The central obscuration causes a reduction of the contrast for low-to-mid spatial frequencies as shown in modulation transfer function (MTF) plot in FIG. 2B. Compared to the diffraction-limit MTF of the objective without central obscuration (dashed curve in FIG. 2B), the diffraction-limit MTF of Schwarzschild objective at mid-spatial frequencies is much smaller. In addition, the spider vanes also cause a faint diffraction pattern as shown in FIG. 2C, which should be a concentric ring pattern for the objective without central obscuration. The amount and distribution of the diffracted energy depends on the width, shape, and number of spider vanes, as well as the diameter of the secondary mirror. In addition, the image contrast is further reduced by the scattered light from the spider vanes and the secondary mirror.

(b) Low light efficiency. As evident from FIG. 2A, only the outer ring of the aperture can transmit the light. Therefore, the light efficiency is reduced significantly because: (1) the illumination light that can be delivered to the focal point is less; and (2) less light from the sample can be collected by the objective.

(c) Low image quality for off-axis objects. As shown in FIG. 2B, the MTFs for off-axis fields are much lower than on-axis fields. Since the objective is a rotational symmetry system and both mirrors are spherical, there is not enough freedom to control off-axis aberrations, which heavily degrades the system performance.

(d) Low resolution. Due to the inherent limitation of on-axis configuration, NA is typically low (<0.5), limiting the spatial resolution. An objective with NA greater than 0.5 typically has low light efficiency and small field of view.

(e) Reduced axial resolution. The central obscuration will also produce quasi-Bessel type beams with a reduced axial resolution, making this type of reflective objectives less attractive for depth-resolved nonlinear optical imaging.

Aside from the above noted shortcomings, additional subsections of the microscope, including the imaging and relay optics subsections can each limit the capabilities of the microscope by restriction of the operating range of wavelengths, introducing group delay dispersion and other disadvantageous described above. The disclosed embodiments address these problems by disclosing a fundamentally new class of true all-reflective microscopes, that among other features and benefits, do not have an obscuration. In particular, the disclosed microscopes include an all-reflective off-axis optical system, from light source to sample and to detector, that is characterized as having substantially zero chromatic aberration. In this regard, all illumination (or excitation) light will be focused at, and all signals will be collected from, the same point. The disclosed microscopes further have low group delay dispersion, and thus no pre-conditioning of pulses is needed (e.g., for non-linear imaging). Additionally, high light efficiency in a wide spectral range (UV to far-IR) is provided. The disclosed systems further have high throughput imaging and uniform performance from UV to IR.

Figures 3A, 3B, 3C:
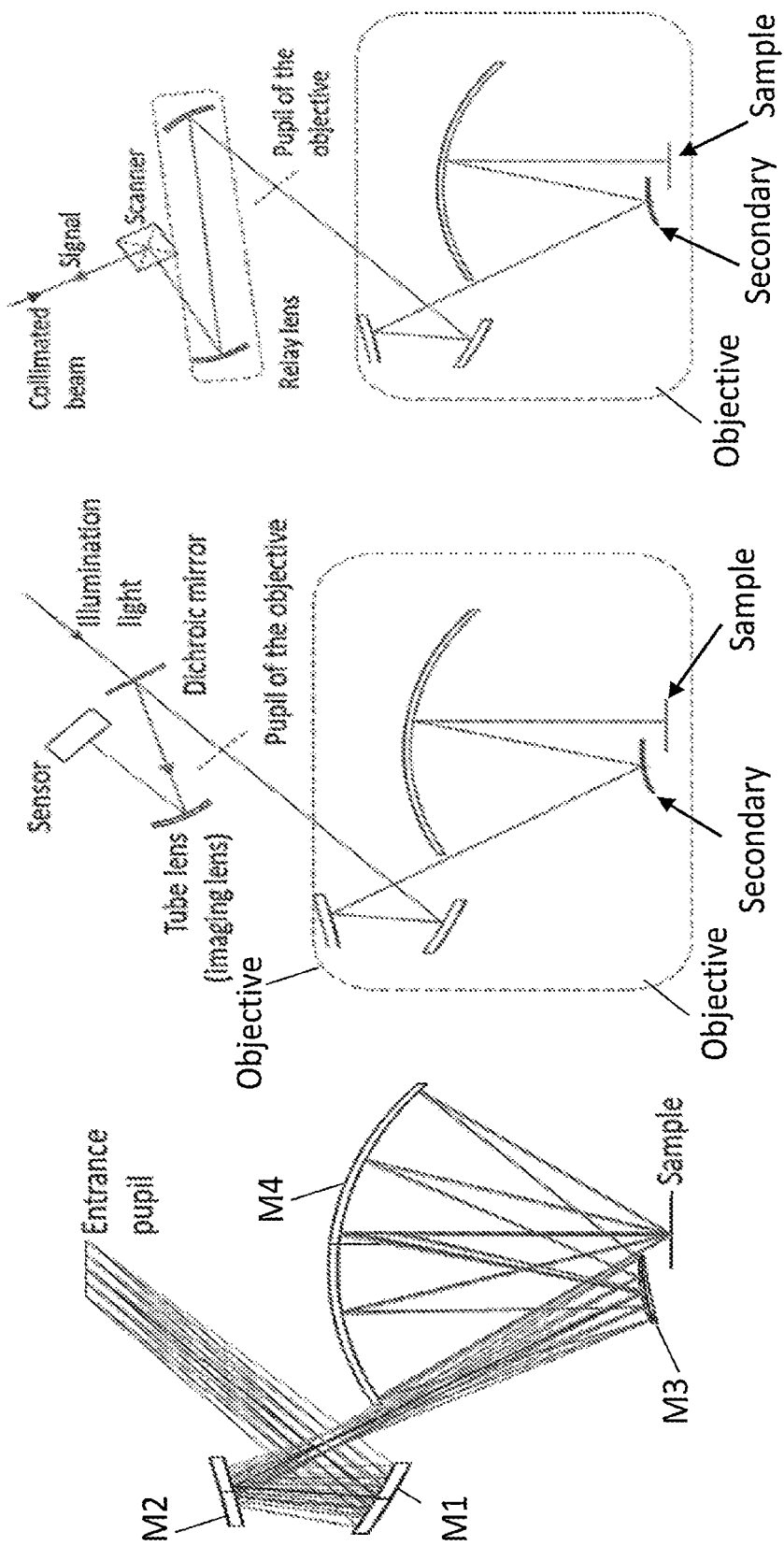
FIG. 3A illustrates an all-reflective microscope objective in accordance with an example embodiment.
FIG. 3B illustrates an epi-illumination microscope configuration suitable for wide field of view (FOV) fluorescence and spectral imaging in accordance with an example embodiment.
FIG. 3C illustrates a point scanning microscope configuration in accordance with an example embodiment.

In some embodiments, an off-axis, non-obscuration objective with freeform surfaces is provided that addresses all issues related to the Schwarzschild reflective objective: low image contrast, low throughput, and low image quality for an off-axis object. An example configuration is illustrated in FIG. 3A in which the mirrors M3 and M4 are positioned at an off-axis location. Light from the sample is received by the primary mirror M4, is reflected onto the secondary mirror M3, and onto the other two mirrors M2, M1. In some embodiments, an all-reflective relay lens is used for different light sources, from UV to far-IR. With freeform surfaces, the disclosed all-reflective relay lens has a larger field of view (FOV) and better performance compared to the traditional reflective relay lens with spherical surfaces. In some embodiments, an all-reflective imaging lens collects the light from a wide range of spectra, including from UV to far-IR. The imaging lens can be very compact due to freeform surfaces. The disclosed all-reflective microscopes can be constructed using a modular design which allows users to build their own all-reflective microscopes with different reflective objectives, relay lenses, and imaging lenses.

FIGS. 3B-3C illustrate two example microscope configurations in accordance with example embodiments of the disclosed technology. FIG. 3B is an epi-illumination microscope suitable for wide FOV fluorescence and spectral imaging. A beam splitter or a dichroic mirror is placed between the objective and the tube (imaging) lens that allows an illumination beam to enter for illuminating the sample, and to direct the light received from the sample to the imaging lens and the detector (sensor in FIG. 3B). The all-reflective tube (imaging) lens in FIG. 2B can a concave mirror or other implementations of an imaging lens, examples of which are further described in this patent document. Since the beam splitter is in a collimated beam space, and the plate beam splitter or the dichroic mirror is thin, the chromatic aberrations it introduces are small. The remaining components in FIG. 3B are similar to those described in FIG. 3A.

FIG. 3C illustrates the configuration of a point scanning microscope in accordance with an example embodiment that can be used as a nonlinear microscope. This configuration includes a scanner and a relay lens section. The laser light is collimated by, for example, an off-axis parabolic mirror. The relay lens images the scanner to the entrance pupil of the all-reflective microscope objective. The all-reflective relay lens section depicted in FIG. 3C can have a first concave mirror and a second concave mirror, or other implementations of a relay lens, examples of which are further described in this patent document. The light collected from the sample after exiting the objective is directed to the detector (not shown) via the relay lens section and the scanner. It should be noted that the disclosed embodiments that utilize all-reflective components can be implemented for all types of microscopy techniques, including conventional and fluorescence microscopy. It should be further noted that while in FIGS. 3B and 3C the dotted box identifies the "objective" as the basic configuration of FIG. 3A, it is understood from the description of this patent document, that other depicted components can also be referred to as being part of, or as being separate from, the objective.

Variable Compensation: one of the features of the disclosed microscopes is that the axial position of at least one reflective surface can be adjustable to compensate the spherical aberration introduced by the cover glass or immersion liquid. Therefore, the all-reflective microscope accurately images the biological samples under the cover glass and/or inside the immersion liquid.

Relay Optics: A relay lens is required for many high-resolution scanning microscopes, such as confocal and multiphoton, to relay the scanner to the entrance pupil of the objective. The main limitation of the state-of-the-art reflective relay optics is that the scan angle is limited by the off-axis aberrations because the spherical mirrors are tilted or decentered, but spherical mirrors are not effective in controlling off-axis aberrations.

FIG. 4A illustrates the configuration of a traditional reflective relay with two reflective surfaces, where optical components with spherical surfaces are used. FIGS. 4B and 4C illustrate two examples of compact reflective relay lenses with three and four reflective surfaces. The scanner can be placed in Plane 1, and then relayed to the entrance pupil (Plane 2) of the objective by the relay optics, whose magnification is configured to match the beam size with the diameter of the entrance pupil. In FIG. 4B, three mirrors are used to provide a more compact configuration. In some embodiments, mirror M2 is a flat mirror, while in other embodiments mirror M2 can be a non-flat mirror. Mirrors M1 and M3 can generally have freeform surfaces. FIG. 4C illustrates a yet more compact configuration by utilizing four mirrors, M1 to M4. One or more of the mirrors can include freeform surfaces. Having additional mirrors and utilizing freeform surfaces provide additional means for reducing aberrations and correcting imaging artifacts. The advantages of using freeform surfaces in relay optics include: (1) more options for compact configurations (such as in configurations of FIGS. 4B-4C); (2) larger FOV (scan angle); and (3) better performance in image resolution and light efficiency.

Figure 5C:
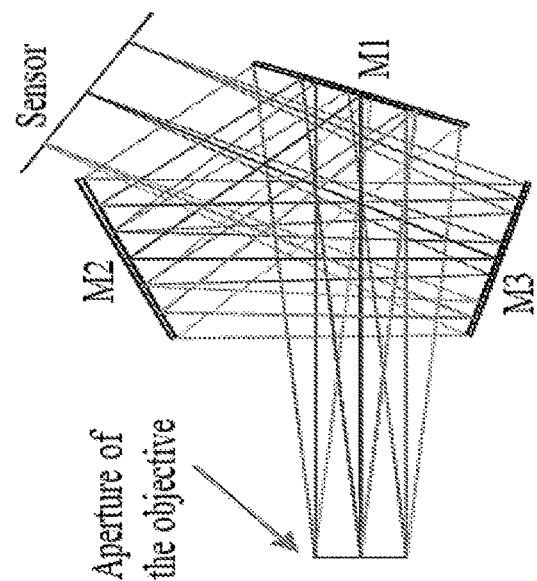
FIG. 5C illustrates a third example of an all-reflective imaging lens that can be used in the disclosed microscope configurations.
Figure 5A:
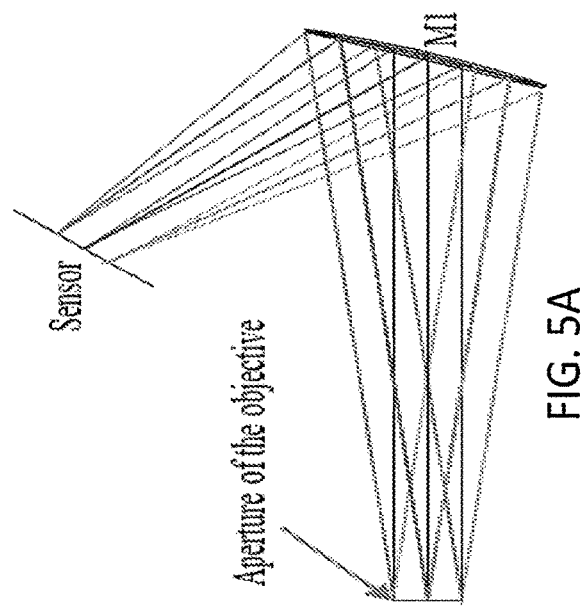
FIG. 5A illustrates a first example of an all-reflective imaging lens that can be used in the disclosed microscope configurations.
Figure 5B:
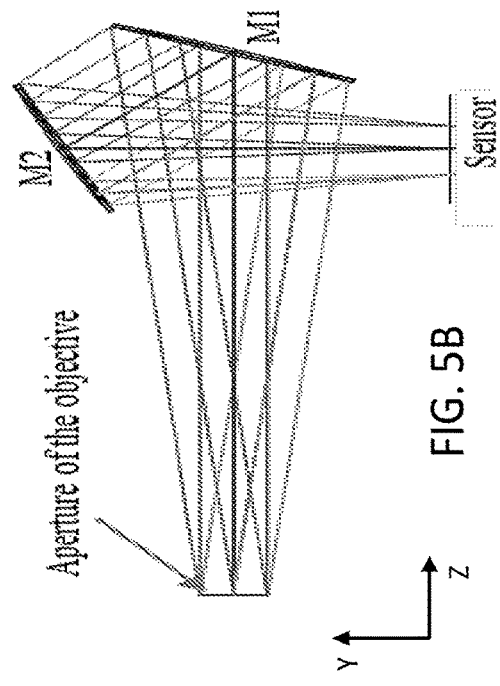
FIG. 5B illustrates a second example of an all-reflective imaging lens that can be used in the disclosed microscope configurations.

Imaging Lens (e.g., tube lens): Together with the objective, the imaging lens images the detailed features of the sample to the sensor. Currently, all imaging lenses (for both reflective and refractive objectives) are refractive type. In the disclosed embodiments, compact off-axis reflective imaging lenses are implemented that can be used in a broad range of spectra from the UV to IR. FIGS. 5A-5C illustrate three example imaging lens configurations, with a single mirror, two mirror and three mirrors, respectively. In particular, in FIG. 5A a single mirror, M1, is used to image the aperture of the objective to the sensor. In FIG. 5B, two minors, M1 and M2 are used; M1 is positioned at an angle with respect to the incoming rays (e.g., Z-direction) and reflects the light it receives toward M2, which is also positioned at an angle (e.g., with respect to the Y-direction). The light collected from objective thus undergoes two reflections before reaching the sensor. The configuration in FOG. 5C includes three mirrors M1, M2 and M3, all of which are positioned at angle (can be different angles) with respect to the rays. The light collected from objective thus undergoes three reflections before reaching the sensor. Similar to the relay optics configurations, the imaging lens mirrors can have freeform surfaces to facilitate the design objectives in terms of performance, compactness and field of view.

Fabrication: Single point diamond turning is a manufacturing technique to produce precision optical components with spherical, aspheric, freeform, and discontinuous surfaces. Most polymers and many crystals are suitable for diamond turning process, and many of the nonferrous metals lend themselves nicely to diamond machining. Diamond turning is used primarily in machining applications that require a high level of precision. It provides a reliable and proven deterministic method to produce a wide variety of electro/optical components, including optical imaging, thermal imaging and night-vision systems, reflective mirrors for $CO_2$ and YAG laser applications, crystalline materials for UV optics and microlithography, electroless nickel lens mold inserts, plastic lenses, telecommunication components, and alignment devices. In a preferred embodiment, multi-axis diamond turning machine can be used to generate freeform surfaces for different subsections of the disclosed microscope systems.

A key advantage of the diamond turning process is that the mounting features can be directly machined by the same process used to turn the optical surface. The precision of the alignment features can be as high as an optical surface. One of the most difficult tasks in building a high-performance microscope objective is to assemble and align the lenses, as the centering and spacing tolerances are typically less than 1 μm; any deviation degrades image quality significantly. The assembly and alignment are even more challenging fora freeform surface as the rotation is also critical. To address this issue, in some embodiments, the mounting, snap-on features are incorporated into each piece for all elements to assemble by snapping together without active alignment. The centering and spacing can be controlled within 1 μm, and the rotation to within 0.1 milliradian. This process reduces the time and cost to assemble the lenses, but enables the alignment to be maintained with high precision.

Figure 6A:
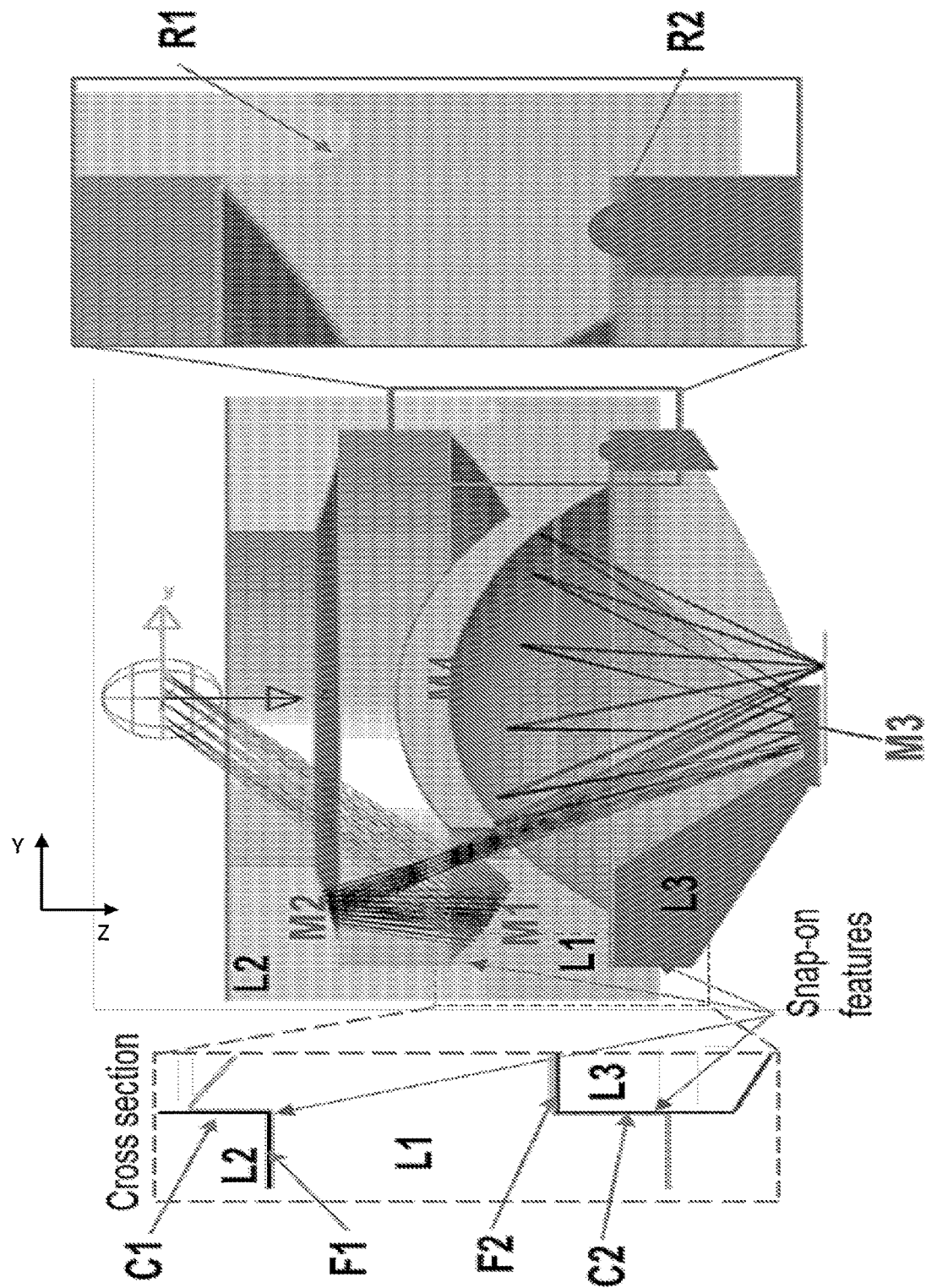
FIG. 6A illustrates an example configuration and associated components for constructing a reflective microscope objective in which at least two optical freeform surfaces are produced from a single piece of material in accordance with the disclosed technology.

According to some embodiments, at least two the plurality of optical freeform surfaces are formed or fabricated from a single piece of material, wherein the at least two optical surfaces are not optically sequential surfaces. For example, in the objective lens configuration of FIG. 3A, light from the sample is sequentially incident upon mirrors M4 to M3 to M2 and to M1. But according to an example embodiment, the first surface M1 and fourth surface M4 are formed using one piece of material. FIG. 6A illustrates the surfaces M4 and M1 that are formed from the same single piece of material (illustrated as one solid color). This feature can be enabled by using the diamond turning process to form the freeform surfaces, while at the same time allowing additional apertures to be formed therein. This principle can be also used in the relay lens that is, for example, shown in FIG. 4B, where the first and third mirrors, M1 and M3, are fabricated in the same element. The disclosed non-sequential fabrication technique can also be easily implemented by injection molding for mass-production.

Figure 6B:
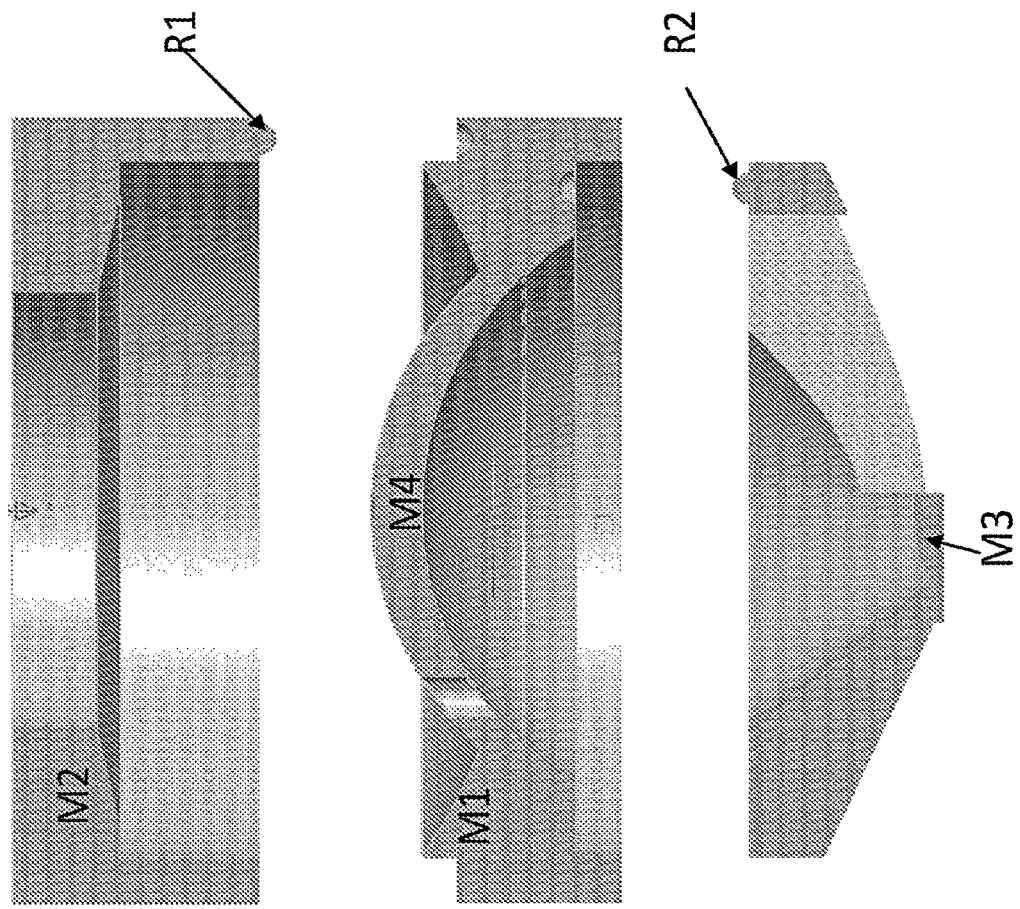
FIG. 6B illustrates a three-dimensional view of some of the components of FIG. 6A.
Figure 6C:
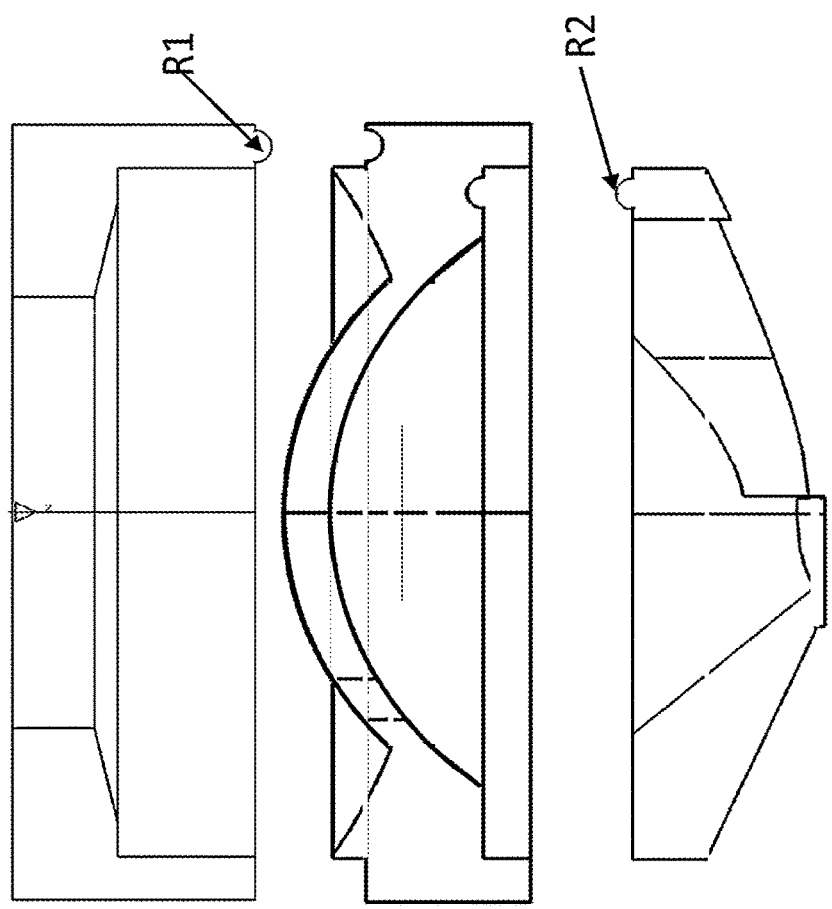
FIG. 6C illustrates a line drawing of the components depicted in FIG. 6B.

FIG. 6A also shows example snap-on assembly for the design of the objective configuration of FIG. 3A. As shown in the left inset cross section: (1) L1 is the element with the first mirror surface M1 and fourth mirror surface M4; (2) L2 is the element for the second mirror surface M2; and (3) L3 is the element for the third mirror surface M3. The contacted cylindrical tube surfaces C1 and C2 can control the relative lateral displacement between three elements very accurately. Similarly, the contacted flat surfaces F1 and F2 can maintain the relative axial displacement between three elements. As shown in the right inset cross section, the contacted half-spheres R1 and R2 and the corresponding spherical dents are fabricated to control the rotation between elements. This feature could simplify the assembly process as some of the surfaces are freeform. To facilitate viewing of the depicted elements, FIG. 6B shows a three-dimensional view of the some of the components of FIG. 6A that are shown as separated elements, and FIG. 6C illustrates a line drawing of the same, while emphasizing the elements R1 and R2. As noted earlier, because of the existence of free-form surfaces, as well as a potential lack of rotational symmetry, the components must be aligned accurately, and potentially in all three dimensions, to ensure the correct placement of those surfaces with respect to one another. This can be effectuated at least in part by elements R1 and R2 in FIGS. 6A-6C (and the associated dents), which provide interlocking or stop mechanisms to ensure proper alignment of, for example, M2 and M3, not only in the axial (Z) direction, but also in transverse (X and Y) directions.

To ensure the surfaces are fabricated to tight specifications, the fabricated surfaces can be measured when the parts are still on the vacuum chuck. This on-machine metrology process significantly improves the fabrication efficiency and improves the surface accuracy—since it is unnecessary to remove the part from the machine, test it off-line, and then remount back onto the machine if re-surfacing is needed.

During the diamond turning process, the non-optical and noncontact regions of the elements can be blackened to reduce stray light and enhance the image contrast. While the metal reflective components can be used directly after it is fabricated, surface coating is typically needed for two purposes: (1) to improve the surface reflectivity; and (2) to prevent the surface from tarnishing. The diamond turned optical surface can be coated for high reflectivity from UV to IR.

Figure 7:
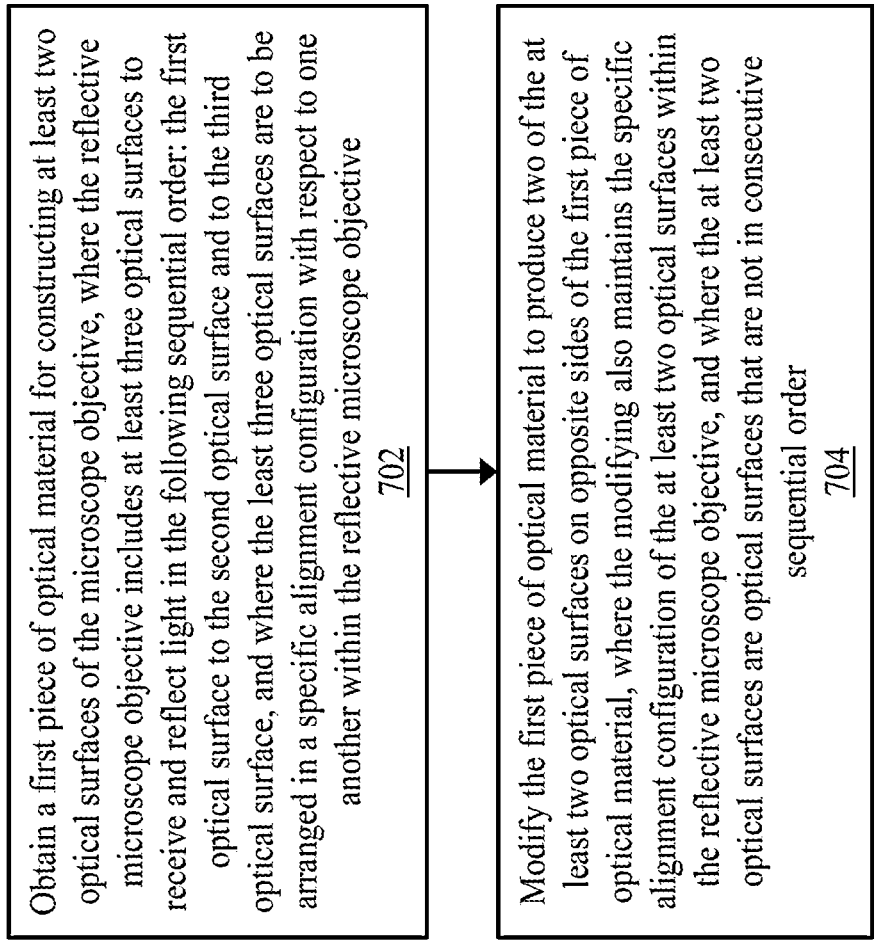
FIG. 7 is a flow chart illustrating a method for constructing a reflective microscope objective in accordance with an example embodiment.

FIG. 7 illustrates a set of operations that can be carried out for construction of a reflective microscope objective in accordance with an example embodiment. At 702, a first piece of optical material is obtained for constructing at least two optical surfaces of the microscope objective. The reflective microscope objective includes at least three optical surfaces to receive and reflect light in the following sequential order: the first optical surface to the second optical surface and to the third optical surface, and wherein the least three optical surfaces are to be arranged in a specific alignment configuration with respect to one another within the reflective microscope objective. At 704, the first piece of optical material is modified to produce two of the at least two optical surfaces on opposite sides of the first piece of material. This modification also maintains the specific alignment configuration of the at least two optical surfaces within the reflective microscope objective, and the at least two optical surfaces are optical surfaces that are not in consecutive sequential order.

In one example embodiment, the modifying is carried out using a diamond turning process. In another example embodiment, the reflective microscope objective includes four optical elements: a primary mirror, a secondary mirror, a third mirror and a fourth mirror. In this example embodiment, the modifying includes producing surfaces associated with the primary mirror and one of the third or the fourth mirrors. In yet another example embodiment, the modifying produces a freeform surface for one or more of the at least four optical elements. In still another example embodiment, the above noted method for construction of a reflective microscope objective further includes providing snap-on structures for one or more of the optical elements to allow at least one of the at least four optical elements to be assembled and aligned with another of the at least four optical elements in a snap-fitted fashion. According to another example embodiment, the method further includes applying a metallic coating to one or more of the optical surfaces.

One aspect of the disclosed embodiments relates to a reflective microscope that includes a reflective objective subsection comprising at least three mirrors, wherein at least one mirror is off-axis and non-spherical. The reflective microscope also includes a reflective relay subsection including at least two mirrors having freeform surfaces and positioned to receive light from the reflective objective subsection. The reflective relay subsystem is configured to produce a magnification to allow coupling of light between two planes having differing beam sizes. The reflective microscope additionally includes an imaging sub section including at least one mirror having a freeform surface and positioned to receive light from the reflective relay subsection and to direct light received thereon in reflection in a direction of a sensor.

In example embodiments, all components in each of the reflective objective subsection and the reflective relay subsection are configured to direct light in reflection. In one example embodiment, the reflective microscope further includes a detector, where the detector is either part of the imaging subsection or is a component separate from the imaging subsection, the detector positioned to receive light associated with the sample from one or more reflective surfaces of the imaging subsection, and to produce a signal representative of an image of the sample. In another example embodiment, the reflective relay subsection includes at least three mirrors, wherein two or more of the at least three mirrors have freeform surfaces. In yet another example embodiment, the reflective relay subsection includes at least four mirrors, wherein three or more of the at least four mirrors have freeform surfaces.

According to another example embodiment, the imaging subsection includes at least two mirrors, wherein one or more of the at least two mirrors have freeform surfaces. For example, each of the at least two mirrors are positioned at an angle with respect to an axis associated with light incident on that mirror to allow light received from the reflective relay subsection to undergo at least two reflections in order to be directed in the direction of the sensor. In another example embodiment, the imaging sub section includes at least three minors, wherein two or more of the at least three mirrors have freeform surfaces. In an implementation of this example embodiment, each of the at least three mirrors are positioned at an angle with respect to an axis associated with light incident on that mirror to allow light received from the reflective relay subsection to undergo at least three reflections in order to be directed in the direction of the sensor.

In one example embodiment, each of the reflective objective subsection, the reflective relay subsection and the imaging subsection is designed to introduce substantially no aberrations, such as a peak-valley (P-V) error less than a quarter wave, to wavefronts that travel therethrough. In another example embodiment, at least one reflective surface in each of the reflective objective subsection, the reflective relay subsection and the imaging subsection is a freeform optical surface designed to reduce aberrations in the wavefronts that travel through the corresponding subsection. According to yet another example embodiment, the microscope is operable in a range of wavelengths including ultraviolet to far infrared range of wavelengths with substantially no aberrations, such as with a peak-valley (P-V) error less than a quarter wave, imparted on wavefronts that travel therethrough.

In another example embodiment, the microscope is configured to receive an illumination light from a light source for illuminating the sample. In one example embodiment, the illumination light is coupled to the reflective objective subsection or the reflective relay subsection. In another example embodiment, the reflective microscope is a point scanning microscope including a scanner to receive the illumination light and to produce a scanning light beam for illumination of the sample, wherein the reflective relay subsection is configured to image the scanner to an entrance pupil of the reflective objective subsection. In yet another example embodiment, the reflective objective subsection does not have a central obscuration.

Another aspect of the disclosed embodiments relates to an all-reflective microscope that includes a reflective objective subsection comprising a plurality of freeform minors positioned to receive light from a sample, and a reflective imaging subsection including at least one mirror having a freeform surface and positioned to receive light from the reflective objective subsection and to direct light received thereon in reflection mode in a direction of a sensor. Each of the reflective objective subsection and the reflective imaging subsection includes only components that direct light in the reflection mode, and each of the reflective objective subsection and the reflective imaging subsection introduces substantially no aberrations, such as a peak-valley (P-V) error less than a quarter wave, to the waterfronts that propagate therethrough. Additionally, the all-reflective microscope is operable in a range of wavelengths spanning from ultraviolet to far infrared range of wavelengths.

In one example embodiment, the all-reflective microscope is an epi-illumination microscope and includes a beam splitter or a dichroic mirror to receive illumination light that is input to the reflective microscope system, the beam splitter or dichroic mirror also configured to direct the light received from the sample to the reflective imaging subsection. In another example embodiment, the reflective imaging subsection includes a tube lens. In yet another example embodiment, the reflective imaging subsection includes at least two mirrors, wherein one or more of the at least two minors has a freeform surface, and wherein each of the at least two mirrors are positioned at an angle with respect to an axis associated with light incident on that minor to allow light received from the reflective objective subsection to undergo at least two reflections in order to be directed in the direction of the sensor.

Another aspect of the disclosed embodiments relates to an all-reflective microscope that includes a reflective objective subsection comprising a plurality of freeform mirrors positioned to receive light from a sample, and a reflective imaging sub section including at least one mirror having a freeform surface and positioned to receive light from the reflective objective subsection and to direct light received thereon in reflection mode in a direction of a sensor. Each of the reflective objective subsection and the reflective imaging subsection includes only components that direct light in the reflection mode, and the reflective objective subsection includes at least two mirrors that are positioned off-axis to prevent obscuration of a central portion of field of view of the reflective objective. Additionally, the all-reflective microscope is operable in a range of wavelengths spanning from ultraviolet to far infrared range of wavelengths. In one example embodiment, each of the reflective objective subsection and the reflective imaging subsection introduces substantially no aberrations, such as a peak-valley (P-V) error less than a quarter wave to the waterfronts that propagate therethrough.

Another aspect of the disclosed embodiments relates to a method for construction of an optical system with improved alignment capability. The method includes obtaining a first piece of optical material for constructing at least two optical surfaces of the optical system that includes at least three optical surfaces to receive and reflect light in the following sequential order: the first optical surface to the second optical surface and to the third optical surface, and wherein the least three optical surfaces are to be arranged in a specific alignment configuration with respect to one another within the optical system. The method also includes modifying the first piece of optical material to produce two of the at least two optical surfaces at two different locations of the first piece of optical material, wherein the at least two optical surfaces are optical surfaces that are not in consecutive sequential order. The method additionally includes providing two or more interlocks or stops to enable alignment of the at least two optical surfaces in the specific alignment configuration, wherein at least one of the at least two optical surfaces is not rotationally symmetric.

In one example embodiment, the above method includes providing snap-on structures for one or more of the optical elements to allow at least one of the optical elements to be assembled and aligned with another of the optical elements in a snap-fitted fashion. In another example embodiment, the interlocks or stops include a protruding curved surface that is configured to interlock or come in contact with an associated receptacle. In yet another example embodiment, the interlocks or stops enable alignment of the at least two optical surfaces in three dimensions.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A reflective microscope, comprising:
   a reflective objective subsection comprising at least three mirrors, wherein at least one mirror is off-axis and non-spherical;
   a reflective relay subsection including at least two mirrors having freeform surfaces and positioned to receive light from the reflective objective subsection, the reflective relay subsection configured to produce a magnification to allow coupling of light between two planes having differing beam sizes; and
   an imaging subsection including at least one mirror having a freeform surface and positioned to receive light from the reflective relay subsection and to direct light received thereon in reflection in a direction of a sensor.

2. The reflective microscope of claim 1, wherein all components in each of the reflective objective subsection and the reflective relay subsection are configured to direct light in reflection.

3. The reflective microscope of claim 1, further including a detector, wherein the detector is either part of the imaging subsection or is a component separate from the imaging subsection, the detector positioned to receive light associated with a sample from one or more reflective surfaces of the imaging subsection, and to produce a signal representative of an image of the sample.

4. The reflective microscope of claim 1, wherein the reflective relay subsection includes at least three mirrors, wherein two or more of the at least three mirrors have freeform surfaces.

5. The reflective microscope of claim 1, wherein the imaging subsection includes at least two mirrors, wherein one or more of the at least two mirrors has a freeform surface, wherein each of the at least two mirrors are positioned at an angle with respect to an axis associated with light incident on that mirror to allow light received from the reflective relay subsection to undergo at least two reflections in order to be directed in the direction of the sensor.

6. The reflective microscope of claim 1, wherein the imaging subsection includes at least three mirrors, wherein two or more of the at least three mirrors have freeform surfaces, wherein each of the at least three mirrors are positioned at an angle with respect to an axis associated with light incident on that mirror to allow light received from the reflective relay subsection to undergo at least three reflections in order to be directed in the direction of the sensor.

7. The reflective microscope of claim 1, wherein each of the reflective objective subsection, the reflective relay subsection and the imaging subsection is designed to introduce a peak-valley (P-V) error less than a quarter wave to wavefronts that travel therethrough.

8. The reflective microscope of claim 1, wherein at least one reflective surface in each of the reflective objective subsection, the reflective relay subsection and the imaging subsection is a freeform optical surface designed to reduce aberrations in wavefronts that travel through the corresponding subsection.

9. The reflective microscope of claim 1, wherein the reflective microscope is operable in a range of wavelengths including ultraviolet to far infrared range of wavelengths with a peak-valley (P-V) error less than a quarter wave imparted on wavefronts that travel therethrough.

10. The reflective microscope of claim 1, wherein the reflective microscope is configured to receive an illumination light from a light source for illuminating a sample.

11. The reflective microscope of claim 10, wherein the reflective microscope is a point scanning microscope including a scanner to receive the illumination light and to produce a scanning light beam for illumination of the sample, wherein the reflective relay subsection is configured to image the scanner to an entrance pupil of the reflective objective subsection.

12. The reflective microscope of claim 1, wherein the reflective objective subsection does not have a central obscuration.

\* \* \* \* \*